United States Patent
Nunomura

(10) Patent No.: US 6,871,274 B2
(45) Date of Patent: Mar. 22, 2005

(54) INSTRUCTION CODE CONVERSION APPARATUS CREATING AN INSTRUCTION CODE INCLUDING A SECOND CODE CONVERTED FROM A FIRST CODE

(75) Inventor: Yasuhiro Nunomura, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 487 days.

(21) Appl. No.: 10/163,452

(22) Filed: Jun. 7, 2002

(65) Prior Publication Data

US 2003/0135845 A1 Jul. 17, 2003

(30) Foreign Application Priority Data

Dec. 14, 2001 (JP) ........................................ 2001-381987

(51) Int. Cl.⁷ ............................................. G06F 12/02
(52) U.S. Cl. ....................................................... 712/210
(58) Field of Search ........................................ 712/210

(56) References Cited

U.S. PATENT DOCUMENTS

| | | | | |
|---|---|---|---|---|
| 5,889,961 A | * | 3/1999 | Dobbek ...................... 709/247 |
| 5,983,336 A | * | 11/1999 | Sakhin et al. ................. 712/24 |
| 6,199,126 B1 | * | 3/2001 | Auerbach et al. ............. 710/68 |
| 6,275,921 B1 | * | 8/2001 | Iwata et al. ................... 712/24 |
| 6,484,228 B2 | * | 11/2002 | Breternitz et al. ............. 711/1 |
| 6,532,121 B1 | * | 3/2003 | Rust et al. ...................... 360/8 |
| 6,587,939 B1 | * | 7/2003 | Takano ........................ 712/210 |
| 6,631,459 B1 | * | 10/2003 | Cho et al. ................... 712/210 |
| 6,633,969 B1 | * | 10/2003 | Lin ............................. 712/210 |

FOREIGN PATENT DOCUMENTS

JP 8-328817 12/1996

OTHER PUBLICATIONS

J. Turley, "*Thumb Squeezes ARM Code Size*" The Insider's Guide to Microprocessor Hardware, Microprocessor Report, vol. 9, No., Mar. 1995, pp. 6–9.

C. Lefurgy, et al, "*Improving Code Density Using Compression Techniques*" IEEE Published in the Proceedings of Micro–30, Dec. 1997, 10 pages.

* cited by examiner

*Primary Examiner*—Eric Coleman
(74) *Attorney, Agent, or Firm*—McDermott Will & Emery LLP

(57) ABSTRACT

A processor includes a conversion table storage unit storing therein a table used to convert to a non-compressed instruction code from an index included in a compressed instruction code, and a conversion unit receiving a compressed instruction code to extract an index and a parameter therefrom to convert the extracted index to a non-compressed instruction code to incorporate the parameter into the obtained non-compressed instruction code to recover an instruction code for transmission to an instruction decode unit.

7 Claims, 24 Drawing Sheets

F I G. 2

| INDEX | NON-COMPRESSED INSTRUCTION CODE |
|---|---|
| 0 | ... |
| 1 | ... |
| 2 | 1001 1111 1100 0000 0000 0010 |
| ... | ... |

F I G. 7A
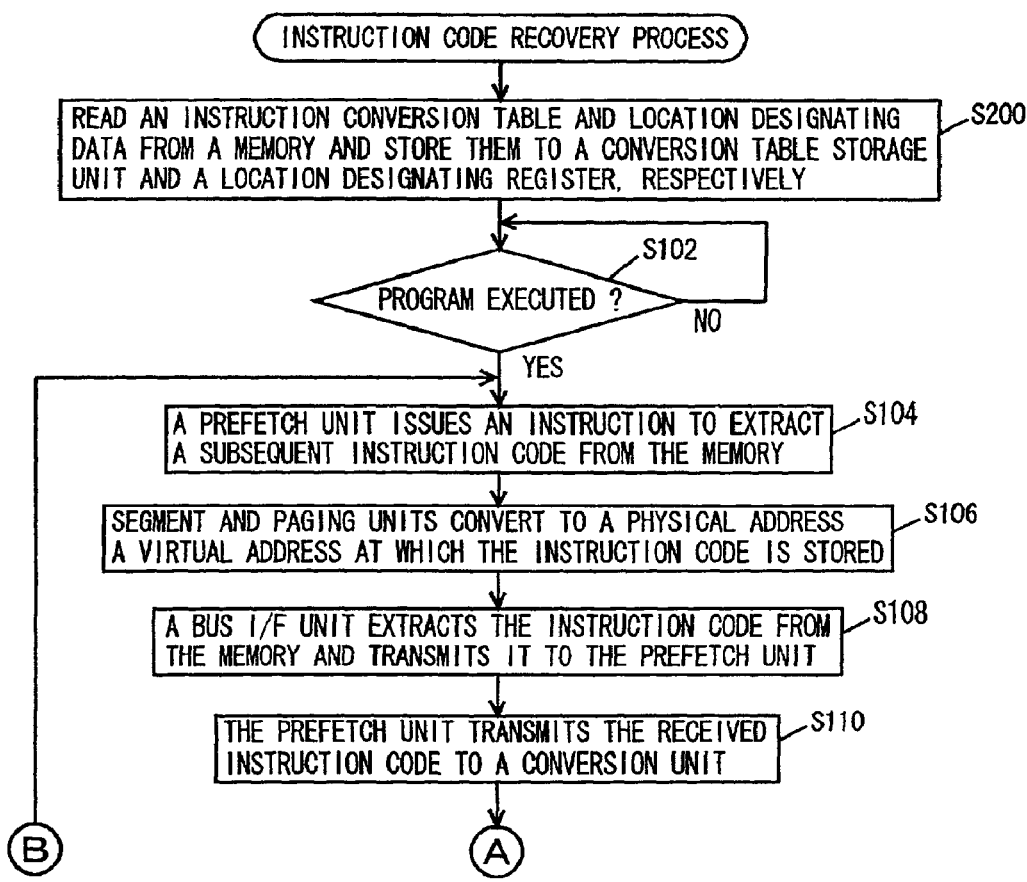

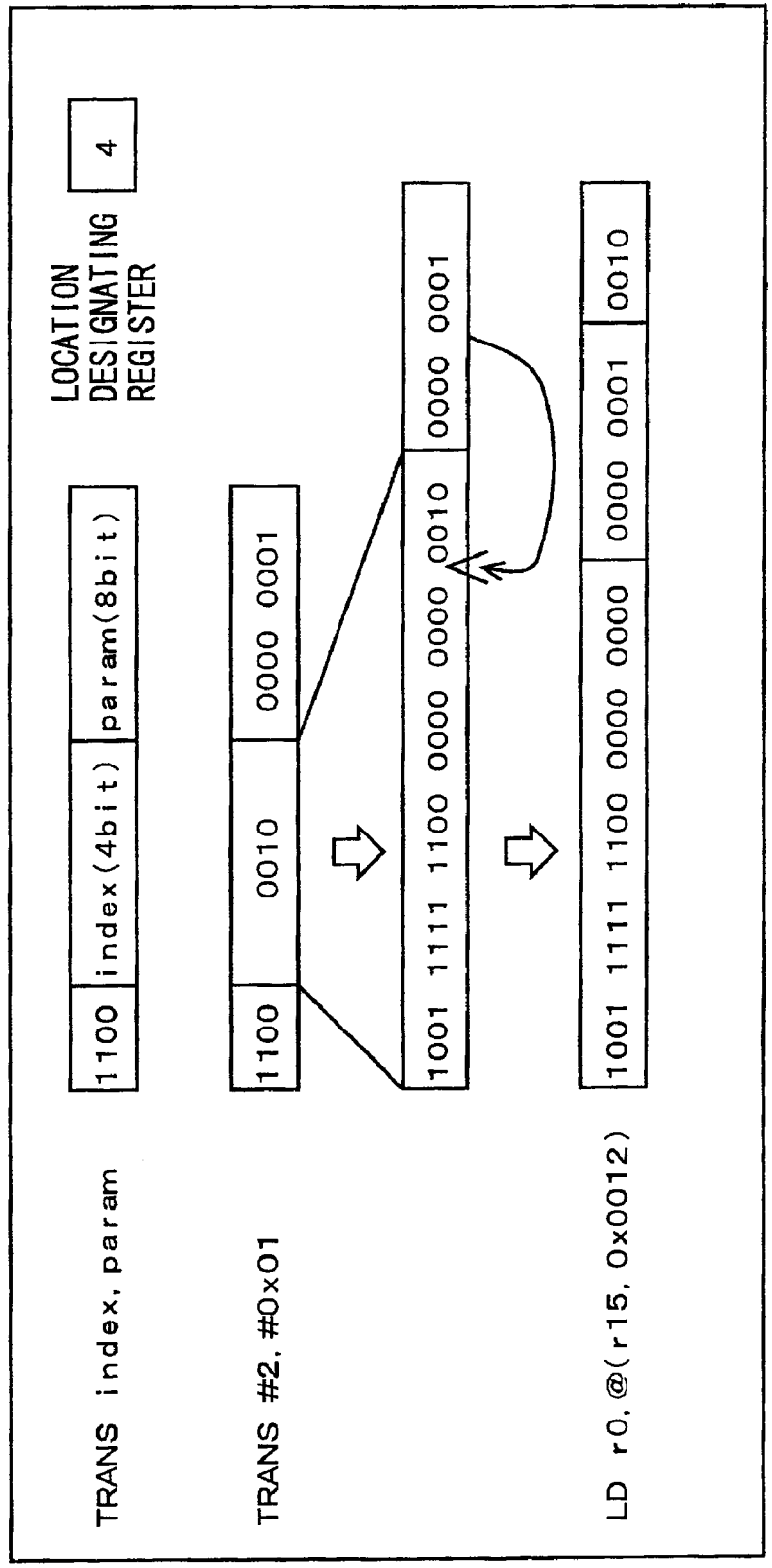

F I G. 9

| INDEX | NON-COMPRESSED INSTRUCTION CODE | LOCATION DESIGNATING DATA |
|---|---|---|
| 0 | ... | ... |
| 1 | ... | ... |
| 2 | 1001 1111 1100 0000 0000 0010 | 4 |
| ... | ... | ... |

F I G. 1 0 A
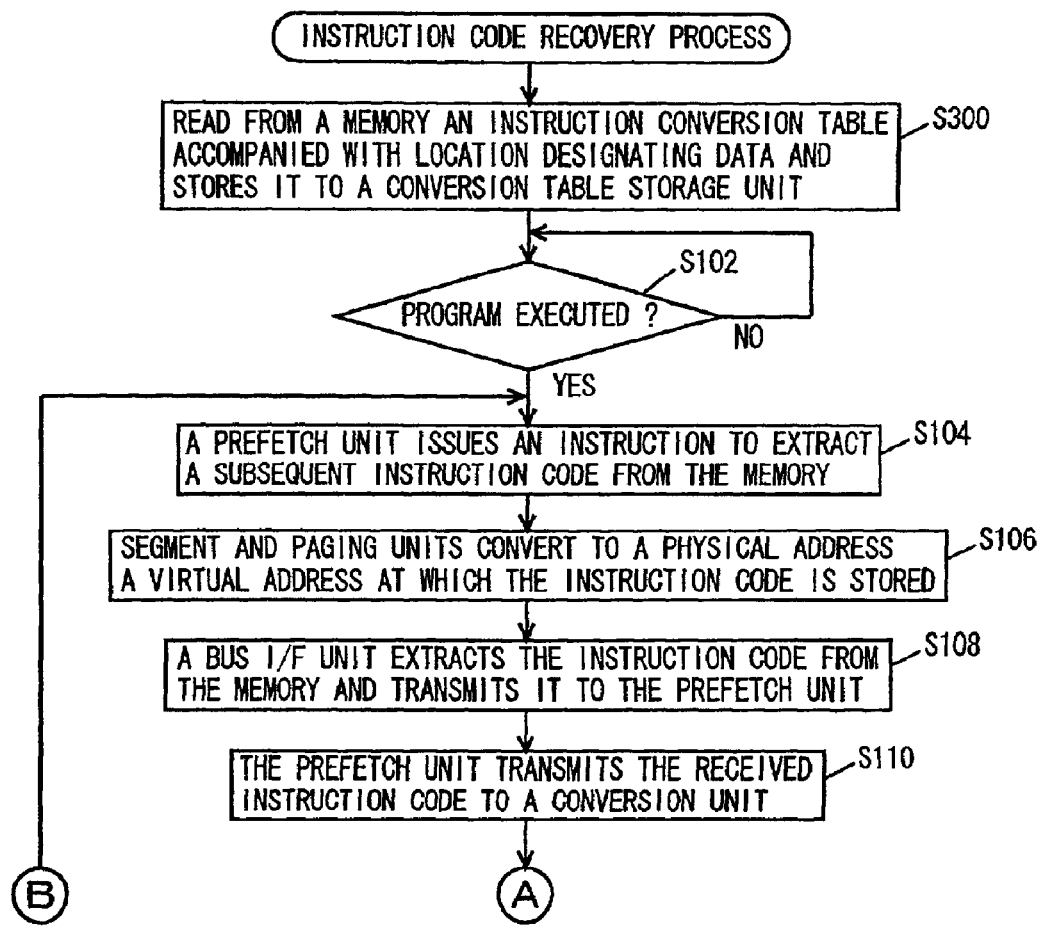

F I G. 1 1 A
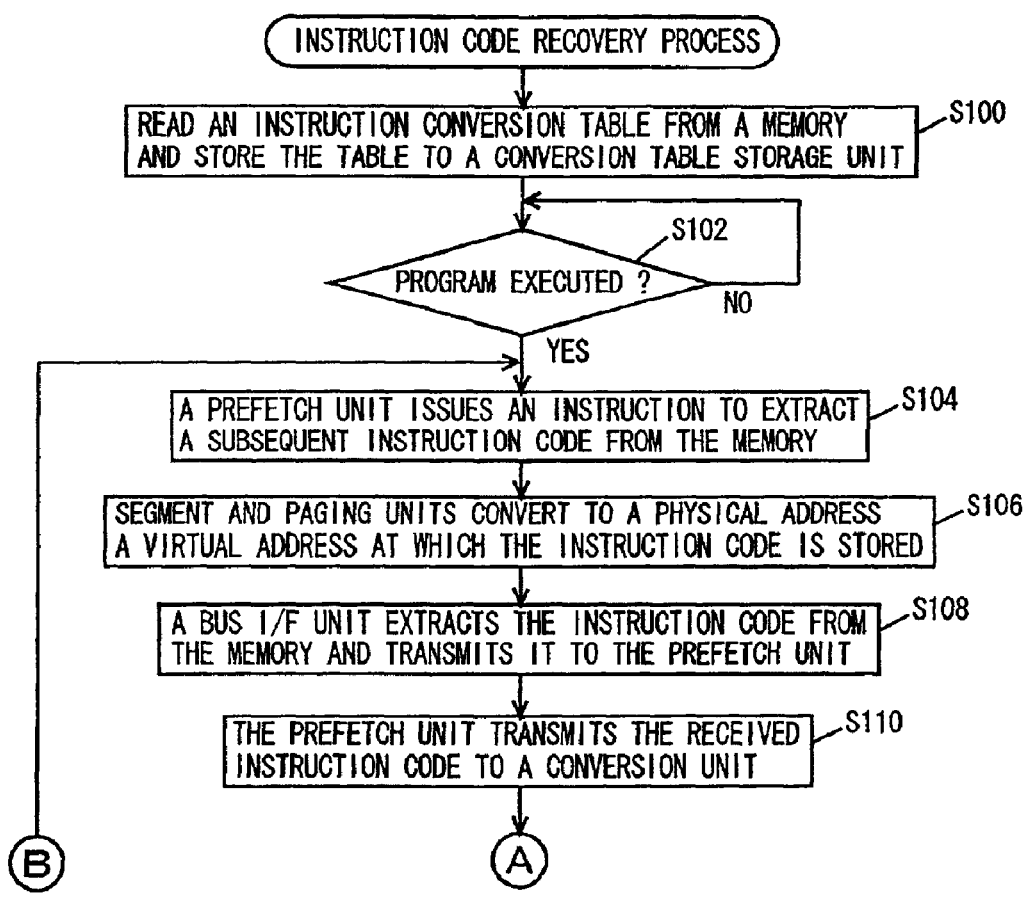

F I G. 1 4

| PARAMETER INDEX | PARAMETER |
|---|---|
| 0 | ... |
| 1 | ... |
| 2 | 1001 0001 0001 0000 0001 0001 |
| ... | ... |

INSTRUCTION CODE CONVERSION APPARATUS CREATING AN INSTRUCTION CODE INCLUDING A SECOND CODE CONVERTED FROM A FIRST CODE

BACKGROUND OF THE INVENTION

1. Field of the Invention

The present invention relates generally to techniques used to execute an instruction in a computer including a processor and a memory, and in particular to those implementing a desired program with a small program capacity and a small memory capacity.

2. Description of the Background Art

A computer system reads an instruction code from a storage circuit and causes a processor to decode the instruction code to execute an operation or the like. Computer systems are constantly required to provide rapid processing.

Japanese Patent Laying-Open No. 8-328817 discloses a computer system in which a main memory device is read less frequently to achieve rapid processing. This computer system includes a processor, a storage circuit storing therein an instruction code and data used by the processor, and a data expansion circuit expanding an instruction code and data read from the storage circuit to decompress the instruction code and data. The storage circuit stores the instruction code and data therein, compressed.

The storage circuit stores an instruction code and data compressed by a Huffman coding process or any other similar compression process. The data expansion circuit stores a code conversion table correlating an instruction code free of compression with the instruction code that is compressed, one for one. When the processor executes a fetch operation, a compressed instruction code is read from the storage circuit. In accordance with a compressed instruction and the code conversion table, the data expansion circuit recovers from a compressed instruction code a compression-free instruction code corresponding one for one to the instruction code. The processor receives the compression-free instruction code from the data expansion circuit and causes an instruction decoder to decode the instruction code to execute the instruction. The storage circuit thus has its compressed and stored instruction code and data expanded and thus decompressed to be an instruction code and data free of compression and thus provided to the processor. From the storage circuit a compressed instruction code can be read and a larger number of instruction codes can be read at one time. As such, if the storage circuit is read at low rates, a single instruction code can still be read faster than conventional to provide increased overall processing rate. Furthermore, compression and resultant, reduced program capacity allow the storage circuit to have reduced capacity for storing the program. As such, as compared to a case without compression, an equivalent function can be implemented with reduced system cost.

In the computer system of the above-described publication, however, the code conversion table is stored to correlate an instruction code free of compression with the instruction code that is compressed, one for one. For example if there are 100 instruction codes then in the code conversion table there are 100 entries and 100 compression-free instruction codes are thus stored in the table. This computer system is disadvantageous as it requires increased memory capacity to store this code conversion table.

SUMMARY OF THE INVENTION

The present invention contemplates an instruction code conversion apparatus dispensing with a large storage unit.

The present invention also contemplates an instruction code conversion apparatus using a compressed instruction code to allow reduced program capacity to dispense with a large storage unit.

The present invention also contemplates an instruction code conversion apparatus using an efficiently compressed instruction code to allow reduced program capacity to dispense with a large storage unit.

The present invention also contemplates an instruction code conversion apparatus using a complicated and yet efficiently compressed instruction code to allow reduced program capacity to dispense with a large storage unit.

The present invention also contemplates an instruction code conversion apparatus avoiding repetitive expansion of a compressed instruction code to dispense with a large storage unit.

In the present invention an instruction code conversion apparatus converts a first code to a second code longer in bit length than the first code to create an instruction code including the second code. The instruction code conversion apparatus includes: a storage unit storing therein information provided for converting the first code to the second code; and a conversion unit connected to the storage unit, and receiving the first code and a third code, converting the first code to the second code based on the first code and the stored information, and determining a fourth code from the second code and the received third code to create an instruction code including the second and fourth codes.

Information stored in the storage unit is used to convert the first code to the second code. When the first and third codes are received, the conversion unit converts the first code to the second code. Based on the second code and the third code an instruction code is created. Since the first code is shorter than the second code, using the first code to describe a program allows a desired operation to be implemented with a short program. The instruction code is the second code plus the fourth code. For example, the fourth code can be a parameter corresponding to the second code. As such, an instruction code, each conventionally with the first code correlated therewith and thus stored, can have a portion replaced with a parameter to represent a plurality of instruction codes in a common, single second code. This can reduce information stored in the storage unit for converting the first code to the second code.

More preferably the conversion unit includes a unit exactly incorporating the received third code into the second code at a predetermined location to determine the fourth code to create the instruction code.

The conversion unit can incorporate the received third code (for example a parameter indicating an amount of offset or an address of data read in response to a read instruction) into the second code at a predetermined location to create the instruction code.

More preferably the instruction code conversion apparatus further includes a data storage unit storing therein data correlated with the third code. The conversion unit includes a unit extracting from the data storage unit the data correlated with the received third code and incorporating the extracted data into the second code at a predetermined location to determine the fourth code to create the instruction code.

The conversion unit extracts from the data storage unit the stored data that is correlated with the received third code. The conversion unit can incorporate the extracted data into the second code as the fourth code to create the instruction code.

More preferably the instruction code conversion apparatus further includes a temporary storage unit connected to the conversion unit to temporarily store the created instruction code correlated with the first code, and a control unit connected to the temporary storage unit and determining whether the instruction code correlated with the first code is temporarily stored therein and if so then controlling the temporary storage unit to read an instruction code from the temporary storage unit.

For example, an instruction code created from the first code is associated with the first code (for example an address of a memory having the first code stored therein) and thus stored in the temporary storage unit provided in the form of a cache memory. When the first code is subsequently received and if the instruction code stored in association with the first code also exists in the cache memory then without conversion to the second code the instruction code is read from the cache memory. Thus without the conversion unit creating an instruction code the instruction code stored in the temporary storage unit is immediately read from the temporary storage unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 2 represents data stored in a conversion table in accordance with the first embodiment;

FIGS. 7A and 7B are flow charts representing a procedure of control of a process provided in the processor in accordance with the second embodiment;

FIG. 8 shows a result of the process provided by the processor of the second embodiment;

FIG. 9 represents data stored in a conversion table in accordance with a third embodiment;

FIGS. 10A and 10B are flow charts representing a procedure of control of a process provided in the processor in accordance with the third embodiment;

FIGS. 11A and 11B are flow charts representing a procedure of control of a process provided in the processor in accordance with a fourth embodiment;

FIG. 14 represents data stored in a conversion table in accordance with the fifth embodiment;

DESCRIPTION OF THE PREFERRED EMBODIMENTS

Figure 1:
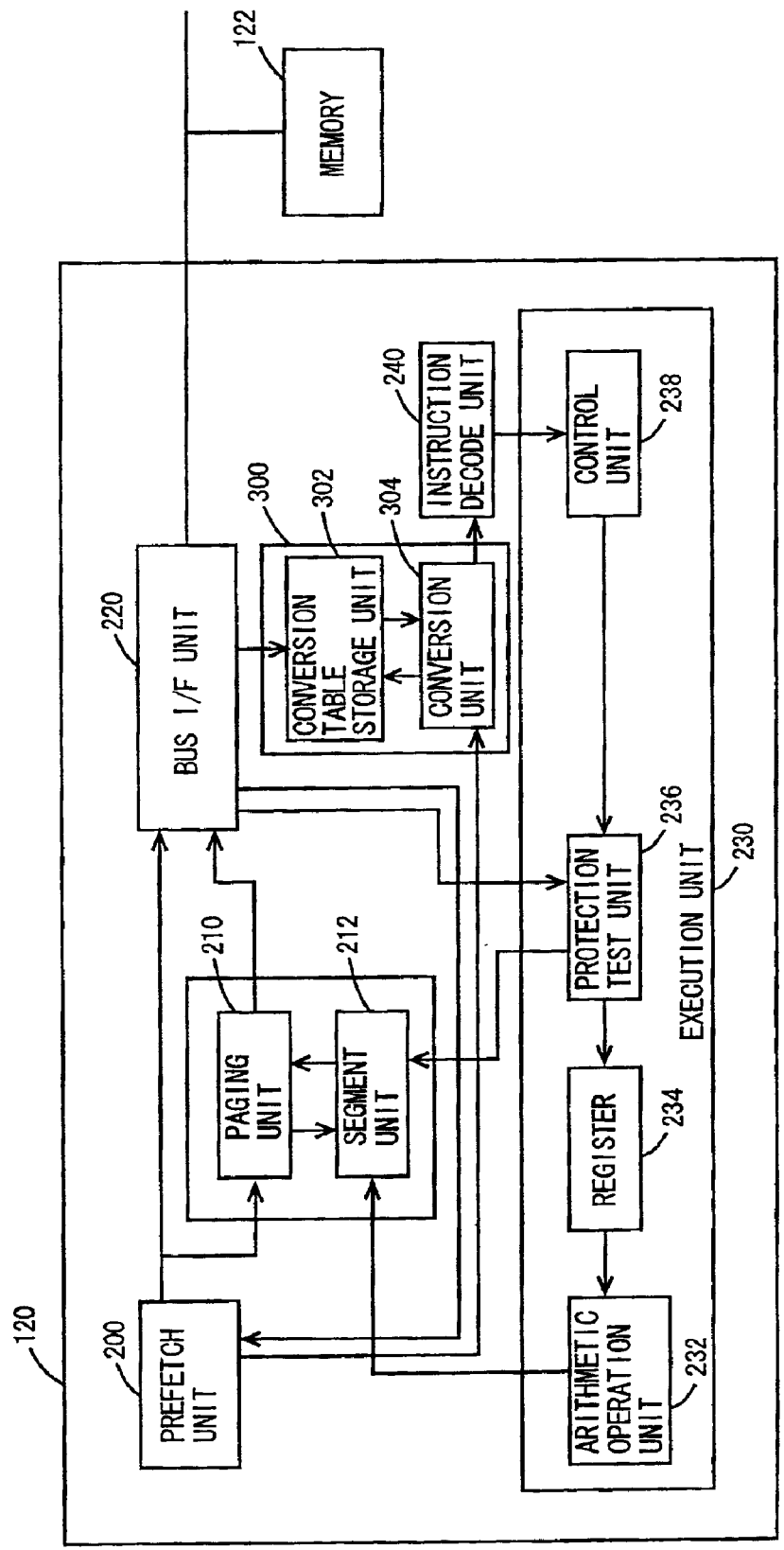
FIG. 1 shows an internal configuration of a processor in accordance with a first embodiment.

Hereinafter reference will be made to the drawings to describe the embodiments of the present invention. In the following description and the drawings, like components are denoted by like reference characters. Their names and functions are also identical. They will thus not be described in detail repetitively.

First Embodiment

FIG. 1 shows a configuration of a processor including an instruction code conversion unit of the present invention in an embodiment. The processor is mounted in a central processing unit (CPU) configured of a semiconductor chip and it is applicable to CPUs of personal computers, communication equipment such as cellular phones, mobile terminals, electronic organizers, information household electrical appliances and AV equipment such as digital cameras, digital video cameras and DVD players and game machines, OA equipment such as printers, and any other similar devices incorporating a computer executing a program.

The present instruction code conversion unit expands a program compressed and thus stored in a memory to save its storage capacity and it is particularly effective for devices with a memory costly per capacity, such as a flash memory, mounted thereon, although it is not limited thereto.

Reference will now be made to FIG. 1 to describe an internal configuration of a processor 120 effecting a basic process. As shown in FIG. 1, processor 120 connected to a memory 122 executes a program stored in memory 122. The program is configured of various instruction codes designating an arithmetic operation, a logical operation, loading data, storing data, and other operations. In the present invention the program has some instruction(s) substituted with a TRANS instruction shorter in bit length than the instruction code, as will be described hereinafter, and the program is thus compressed and stored in memory 122. Memory 122 is for example a random access memory or a non-volatile memory (e.g., a ROM, a flash memory or the like).

Processor 120 includes a prefetch unit 200 instructing a bus interface unit 220 to read a subsequent instruction from memory 122, a paging unit 210 and a segment unit 212 converting from a virtual address to a physical address a location of memory 122 holding the subsequent instruction, bus interface unit 220 communicating data with memory 222, an execution unit 230 executing an instruction in accordance with an instruction output from an instruction decode unit 240, instruction decode unit 240 decoding an instruction code in a form executable by execution unit 230, and a conversion portion 300 converting an instruction code read from memory 122. Conversion portion 300 corresponds to the instruction conversion unit. Note that if the processor does not distinguish virtual and physical addresses, it does not require paging unit 210 or segment unit 212. These do not essentially influence the present invention.

Execution unit 230 includes an arithmetic operation unit 232 executing an arithmetic operation, a register 234 operating as a working memory of execution unit 230, a protection test unit 236 monitoring the operation of the execution unit, and a control unit 238 controlling the units included in execution unit 230.

Conversion portion 300 includes a conversion table storage unit 302 storing therein a conversion table read from memory 122 through bus interface unit 220, and a conversion unit 304 operative in response to an instruction received from prefetch unit 200 to retrieve an instruction code of interest from the conversion table to create an instruction code.

Conversion unit 304 retrieves an instruction code of interest from the conversion table if an instruction code read from memory 122 in response to an instruction from prefetch unit 200 is a predetermined instruction code (a TRANS instruction code described hereinafter). Conversion unit 304 uses the retrieved instruction code and a parameter to create an instruction code and input the created instruction code to instruction decode unit 240.

Reference will now be made to FIG. 2 to describe a table stored in conversion table storage unit 302 in accordance with the present embodiment. As shown in FIG. 2, this conversion table is referenced by means of an index and it stores non-compressed instruction codes corresponding to the values of individual indices, one for one. With an index and a non-compressed instruction code having a one-for-one relationship therebetween, determining a single index determines a single non-compressed instruction code.

Figure 3A:
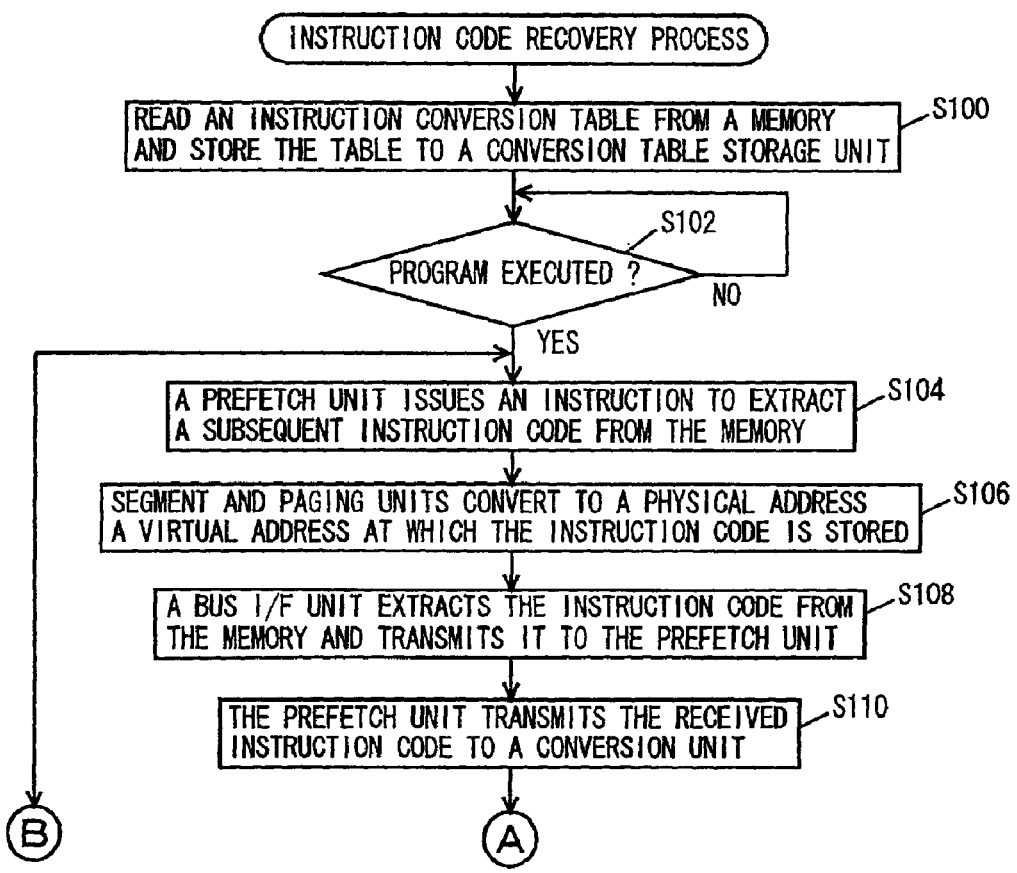
FIGS. 3A and 3B are flow charts representing a procedure of control of a process provided in the processor in accordance with the first embodiment.
Figure 3B:
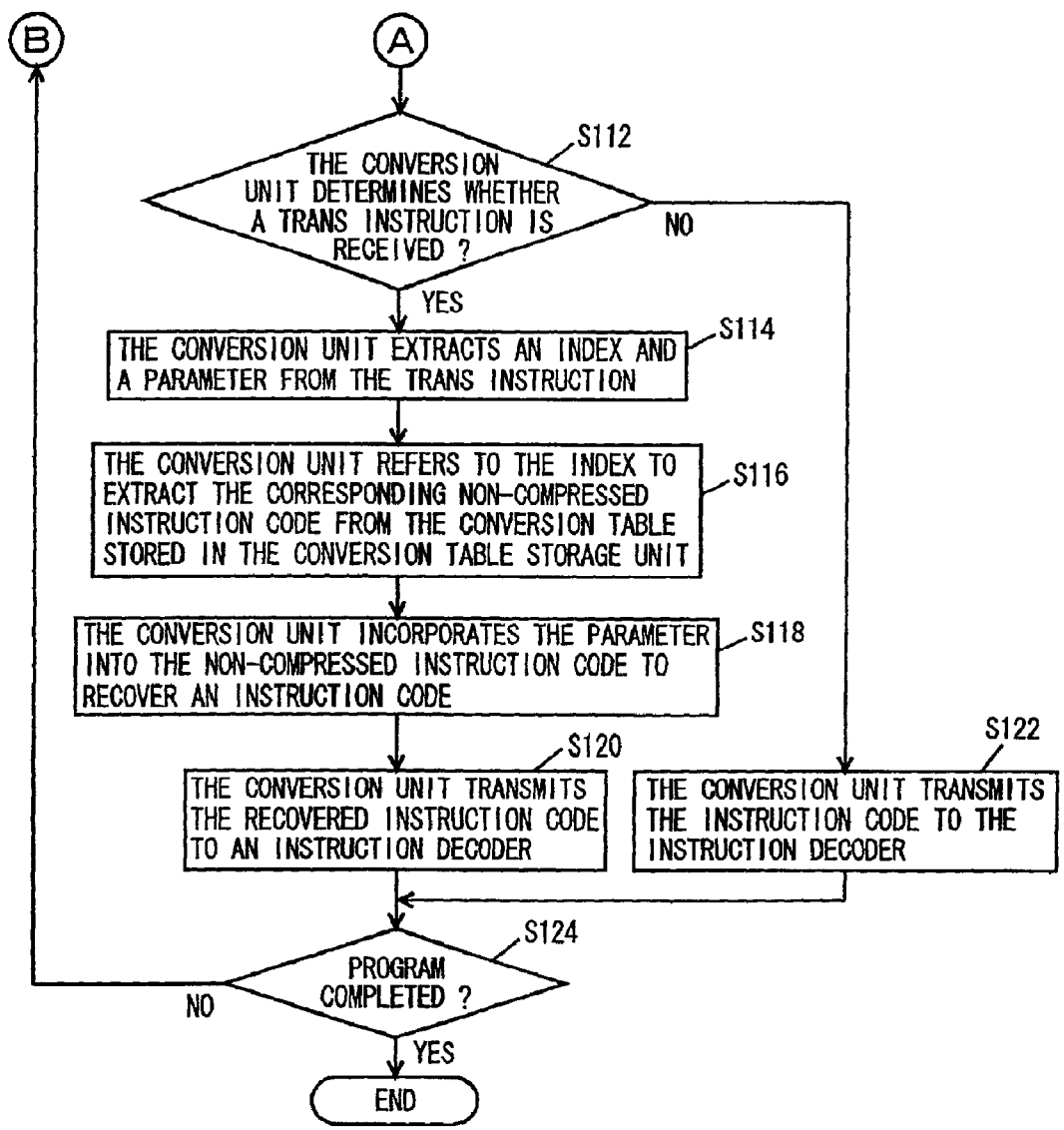

Reference will now be made to FIGS. 3A and 3B to describe a configuration controlling an instruction code recovery process executed in processor 120 including the instruction code conversion unit of the present embodiment.

At step (S) 100, processor 120 reads an instruction conversion table from memory 122 and stores it to conversion table storage unit 302. At S102, processor 120 determines whether a program is executed. If so (YES at S102) then the process proceeds to S104. If not (NO at S102) then the process returns to S102 and waits until the program is executed.

At S104, prefetch unit 200 provides an instruction to extract a subsequent instruction code from memory 122. At S106, segment unit 212 and paging unit 210 convert to a physical address from a virtual address at which the instruction code is stored. At S108, bus interface unit 220 extracts the instruction code from memory 122 and transmits it to prefetch unit 200. At S110, prefetch unit 200 transmits the received instruction code to conversion unit 304.

At S112, conversion unit 304 determines whether the instruction code received from prefetch unit 200 is a TRANS instruction. If so (YES at S112) then the process proceeds to S114. If not (NO at S112) then the process proceeds to S122.

At S114, conversion unit 304 extracts an index and a parameter from the TRANS instruction. At S116, conversion unit 304 refers to the extracted index to extract the corresponding non-compressed instruction code from the conversion table (FIG. 2) stored in conversion table storage unit 302. At S118, conversion unit 304 incorporates the parameter into the extracted non-compressed instruction code to recover an instruction code. Note that the incorporated parameter is the parameter extracted from the TRANS instruction at S114. It should also be noted that the parameter is incorporated into the non-compressed instruction code at a predetermined location.

At S120, conversion unit 304 transmits the recovered instruction code to instruction decode unit 240.

At S122, conversion unit 340 transmits an instruction code to instruction decode unit 240. Note that this instruction code is that which conversion unit 340 received from prefetch unit 200.

At S124, processor 120 determines whether the program ends. If so (YES at S124) then the current instruction code recovery process ends. If not (NO at S124) then the process returns to S104 and the process is effected for a subsequent instruction code.

Based on the configuration and flow chart as described above, processor 120 operates, as will be described hereinafter.

Processor 120 reads an instruction conversion table from memory 122 and stores it to conversion table storage unit 302 (S100). When a program is executed (YES at S102), prefetch unit 200 provides an instruction to extract a subsequent instruction code from memory 122 (S104). Bus interface unit 220 extracts the subsequent instruction code from memory 122 and transmits it to prefetch unit 200 (S108).

The instruction code transmitted from prefetch unit 200 is transmitted to conversion unit 304 (S110) and conversion unit 304 determines whether the received instruction code is a TRANS instruction (S112). If so (YES at S112) then conversion unit 340 extracts an index and a parameter from the TRANS instruction (S114).

Figure 4:
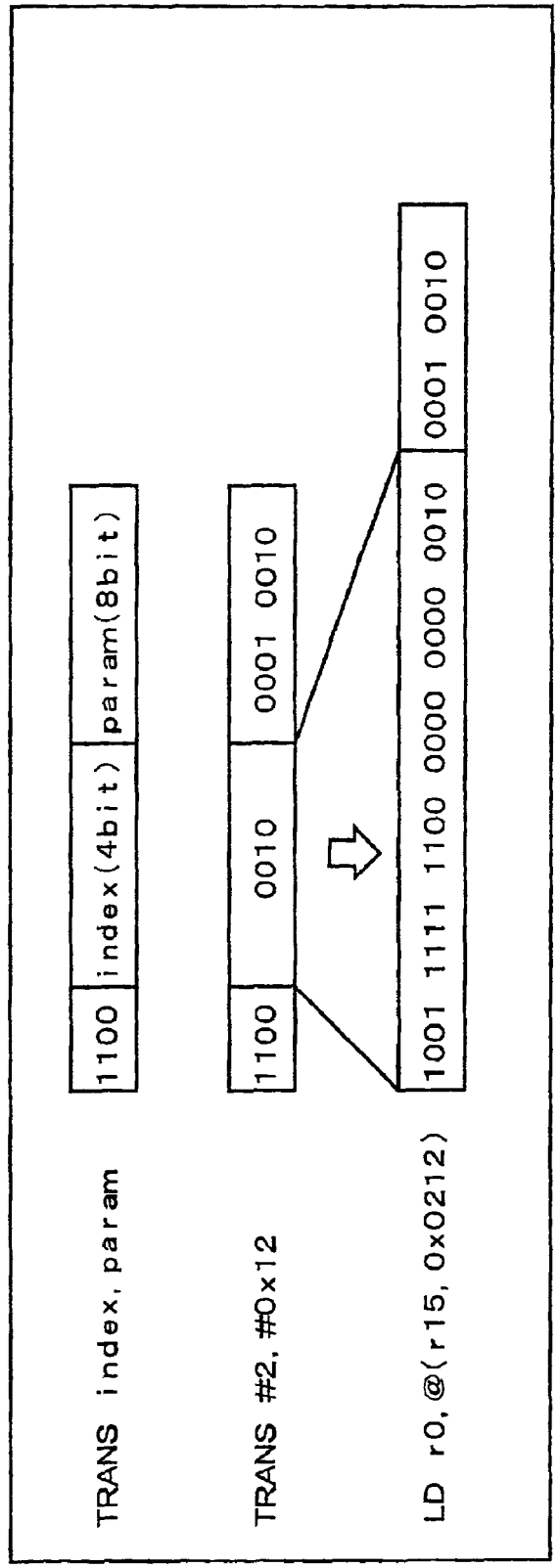
FIG. 4 shows a result of the process provided by the processor of the first embodiment.

Reference will now be made to FIG. 4 to describe an index and a parameter extracted from an instruction code. As shown in FIG. 4, conversion unit 340 receives from prefetch unit 200 an instruction code including data "1100" indicating a TRANS instruction, 4-bit index data, and a 8-bit parameter. As shown in FIG. 4, the index is "0010" and the parameter is "0001 0010". Thus at S114 are extracted "0010" as an index and "0001 0010" a parameter.

Conversion unit 304 refers to the extracted index to extract the corresponding non-compressed instruction code from the conversion table (FIG. 2) stored in conversion table storage unit 302. As shown in FIG. 4, if the extracted index is "0010" then a decision is made that the index in the conversion table (FIG. 2) is "2" and a non-compressed instruction code "1001 1111 1100 0000 0000 0010" is extracted. Conversion unit 304 incorporates the parameter into the extracted non-compressed instruction code to recover an instruction code (S118). Note that as shown in FIG. 4, the parameter extracted from the TRANS instruction is incorporated into the non-compressed instruction code extracted from the conversion table (FIG. 2). It should also be noted that the parameter is incorporated subsequent to the non-compressed instruction code.

Thus in the present embodiment an instruction code conversion unit incorporated in a processor uses a conversion table and an index to extract a non-compressed instruction code correlated to the index and thus stored. A parameter included in a TRANS instruction can be incorporated into the extracted non-compressed instruction code to recover an instruction code. The conversion table can store therein as a single non-compressed instruction code a plurality of instructions serving as a different instruction when it has a different parameter incorporated. The processor can thus dispense with a storage unit having a large capacity to store the conversion table as it can have an instruction code conversion unit using a compressed instruction code to allow reduced program capacity.

In the present embodiment, conversion unit 304 can also be implemented by a conversion program (software) executed by processor 120. This conversion program is also previously stored for example in the memory 122 storage medium and provides an instruction to effect the following process:

A group of instructions to be executed is previously read from memory 122 and if it is a TRANS instruction then the instruction's index is used as an address to access conversion table 302 to extract the corresponding non-compressed instruction code. Furthermore, a parameter of the TRANS instruction is incorporated into the extracted non-compressed instruction code to create a non-compressed instruction code recovered from the TRANS instruction. The created non-compressed instruction code is correlated to the pre-recovered TRANS instruction and stored to a different memory (not shown), which may be a memory internal to processor 120 or a memory of a chip different than the processor.

When processor 120 in effect executes a program stored in memory 122 it follows one of the following two manners:

In a first manner, before the program is executed a TRANS instruction included in the program is collectively converted by the above-described conversion program. In this conversion, the TRANS instruction is substituted with a non-compressed instruction code having been recovered (or an instruction calling a non-compressed instruction code) and prefetch unit 200 does not access the TRANS instruction and instruction decode unit 240 receives only the non-compressed instruction code having been recovered.

In a second manner, while the program is being executed whenever a TRANS instruction is extracted the above-described conversion program is called and from the TRANS instruction a non-compressed instruction code is recovered and meanwhile executed. Most processors can effect an exceptional process when they detect a code unrecognizable as an instruction code. Using the function of this exceptional process allows a TRANS instruction to be detected and a conversion program to be called.

Variation of First Embodiment

Figure 5:
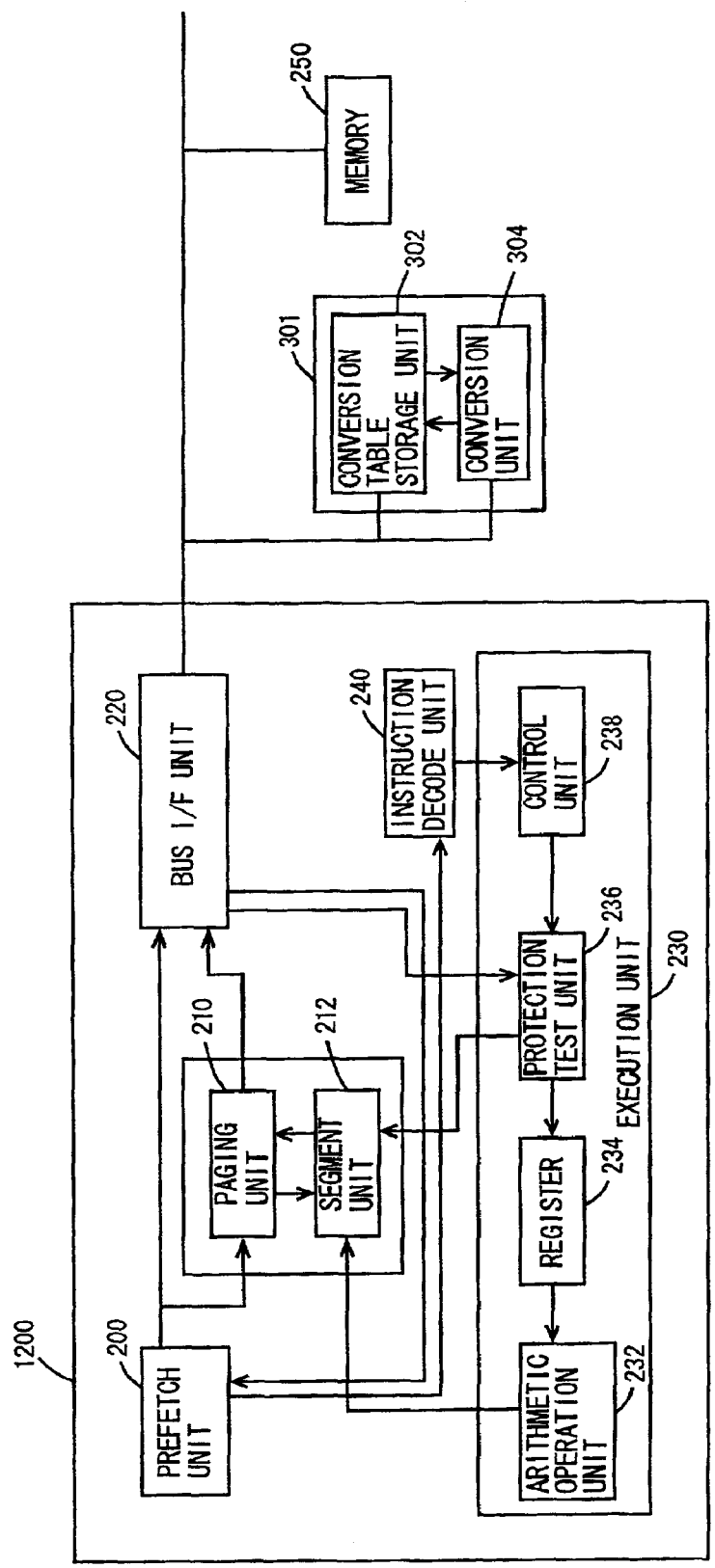
FIG. 5 shows an internal configuration of the processor of the first embodiment in a variation.

Reference will now be made to FIG. 5 to describe a variation of the present embodiment. This variation corresponds to the first embodiment with the processor having a conversion portion mounted external thereto, rather than internal thereto.

As shown in FIG. 5, the present variation provides a processor 1200 including the units of processor 1200 of the first embodiment excluding conversion portion 300. External to processor 1200 is provided a conversion portion 301 including conversion table storage unit 302 and conversion unit 304 described in the first embodiment. In this variation each unit has the same function as described in the first embodiment.

Prefetch unit 200 reads an instruction code from memory 122 through bus interface 220. Before the instruction code is input to the processor, conversion portion 301, as well as the FIG. 1 conversion portion 300, determines whether the read instruction code is a TRANS instruction and if so then it is recovered to a corresponding non-compressed instruction code. The non-compressed instruction code is then transferred through memory interface 220 and prefetch unit 200 to instruction decode unit 240. If a decision is made at conversion portion 300 that an instruction code read from memory 122 is not a TRANS instruction then the instruction code is sent to instruction decode unit 240 as it is.

Thus the processor and conversion portion of the present variation, as well as those of the first embodiment, can provide a processor capable of dispensing with a storage circuit of large capacity as it can use a compressed instruction code to provide reduced program capacity. As described in this variation, the conversion portion may be mounted internal or external to the processor.

Second Embodiment

Hereinafter the present invention in a second embodiment will be described. The present embodiment provides a processor 1202 including a conversion portion 3000 distinguished from conversion portion 300 of the first embodiment. The remainder is identical in configuration to the first embodiment. Furthermore, any units having the same function are denoted by a like name and a like reference character.

Figure 6:
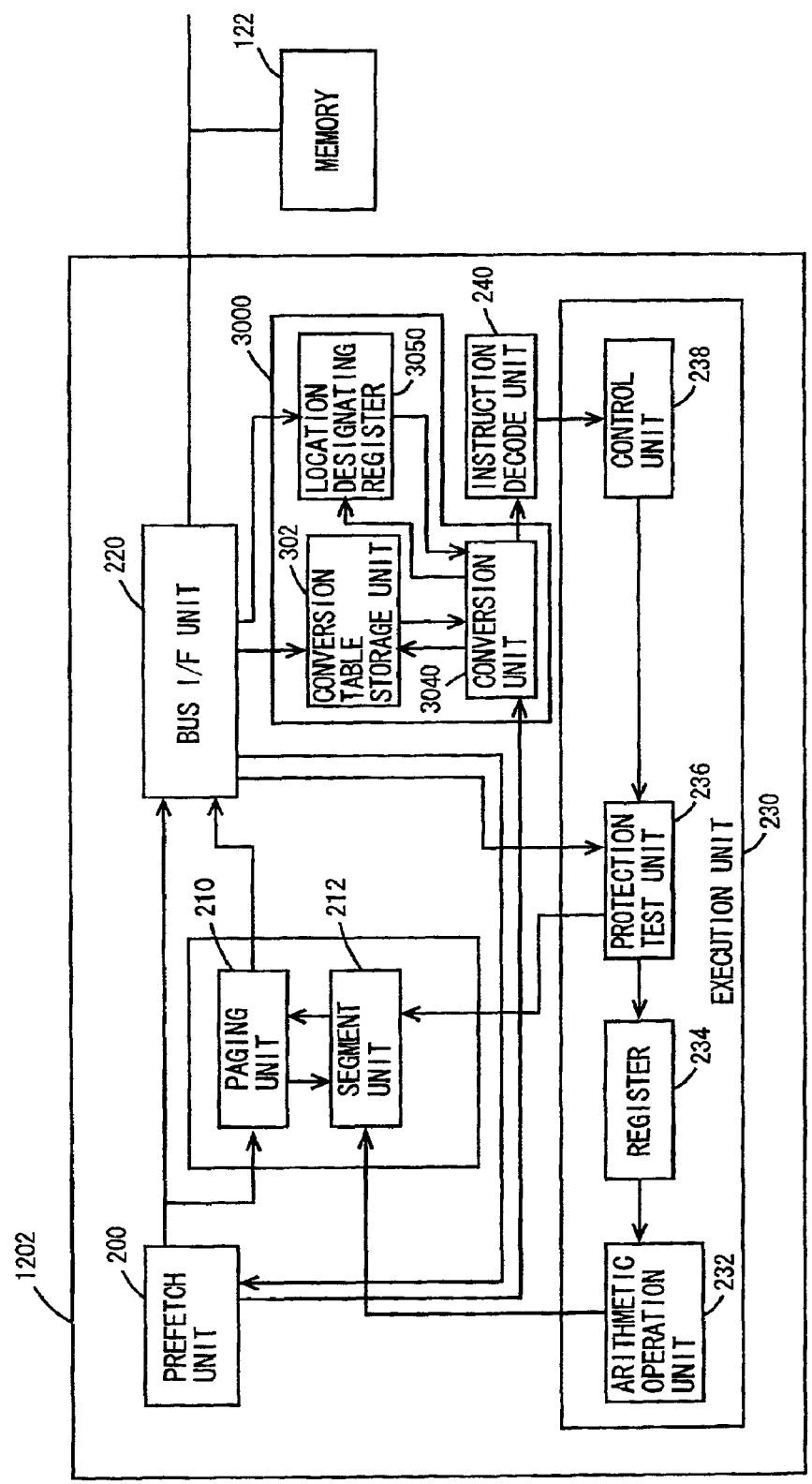
FIG. 6 shows an internal configuration of the processor in a second embodiment.

With reference to FIG. 6, conversion portion 3000 includes conversion table storage unit 302, a conversion unit 3040 and a location designating register 3050. Conversion unit 3040 corresponds to conversion unit 304 of the first embodiment, although its function is partially different. Register 3050 stores therein data representative a location in a non-compressed instruction code at which a parameter is incorporated.

Figure 7B:
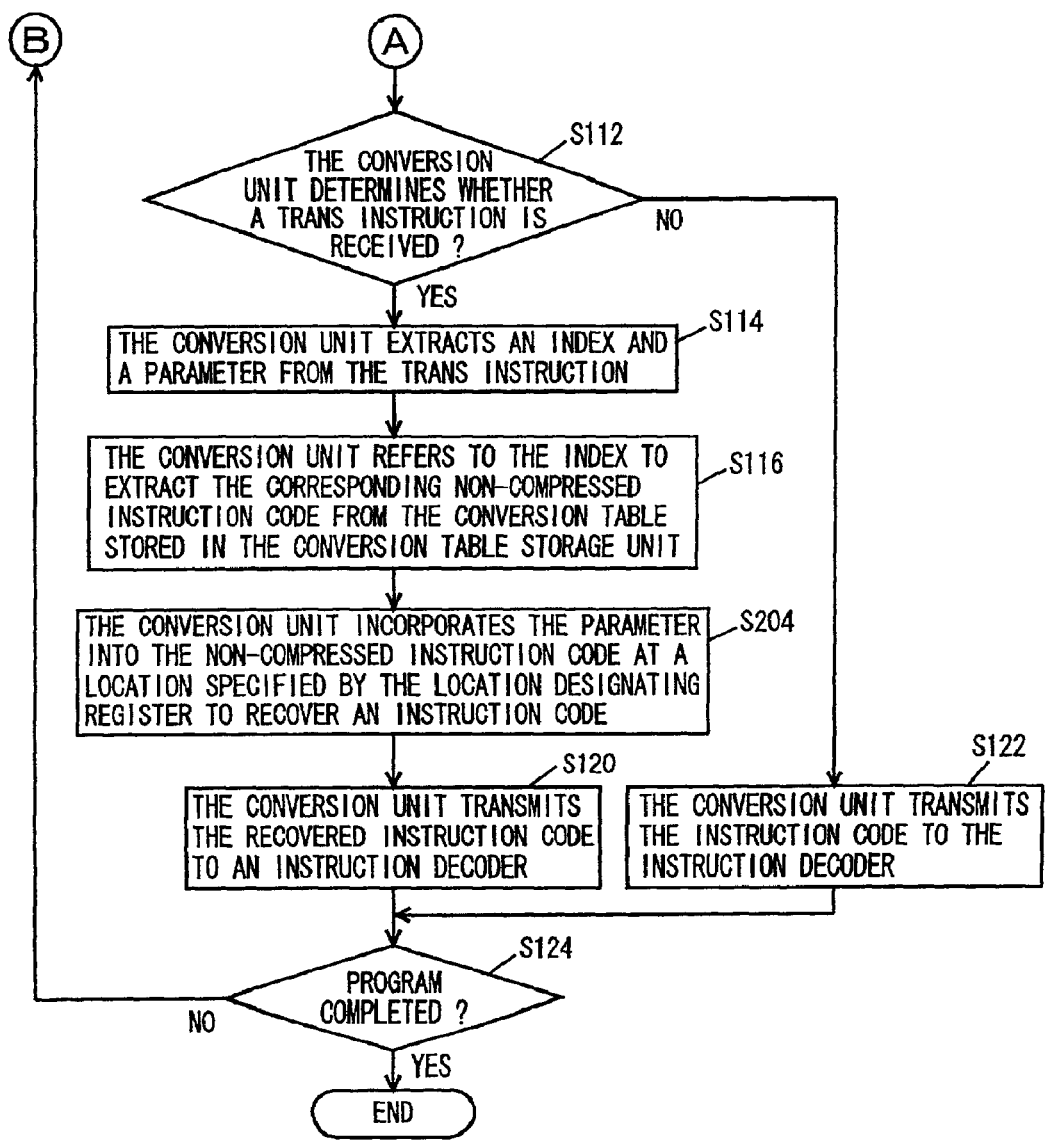

Reference will now be made to FIGS. 7A and 7B to describe a configuration controlling an instruction code recovery process executed in processor 1202 of the present embodiment. Note that any step in the FIGS. 7A and 7B flow charts that are the same as the FIGS. 3A and 3B flow charts is denoted by the same step number and thus provides the same process step.

At S200, processor 1202 reads an instruction conversion table and location designating data from memory 122 and stores them to conversion table storage unit 302 and location designating register 3050, respectively. Note that in the present embodiment for a computer system memory 122 stores therein an instruction code and location designating data.

Then a program is executed and if conversion unit 3040 determines that an instruction code received from prefetch unit 200 is a TRANS instruction then at S204 conversion unit 3040 incorporates a parameter in a non-compressed instruction code at a location specified by register 3050 and thus recovers an instruction code.

In accordance with the configuration and flow chart as described above the present embodiment provides a processor operating as described hereinafter.

With reference to FIG. 8, the present embodiment provides an instruction code similar to that of the first embodiment. Memory 122 stores therein location designating data for storage in location designating register 3050. Processor 1202 reads an instruction conversion table and location designating data from memory 122 and stores them to conversion table storage unit 302 and location designating register 3050, respectively (S200). Location designating register 3050 thus has data "4", as shown in FIG. 8, stored therein.

When a program is executed (YES at S102), bus interface unit 220 extracts the instruction code and location designating data from memory 122 and transmits them to prefetch unit 200 (S200). Prefetch unit 200 transmits the received instruction code to conversion unit 3040. If conversion unit 3040 determines that the instruction code received from prefetch unit 200 is a TRANS instruction (YES at S112) then conversion unit 3040 incorporates a parameter into a non-compressed instruction code at a location specified by location designating register 3050 and thus recovers an instruction code (S204). In doing so, as shown in FIG. 8, in accordance with the data "4" stored in register 3050 the parameter is incorporated at the fourth bit subsequent to the non-compressed instruction code.

Thus the present embodiment can also provide a processor capable of providing the effect of the processor of the first embodiment and in addition thereto using an index to extract a non-compressed instruction code and incorporating a parameter in the extracted non-compressed instruction code at any location.

Third Embodiment

Hereinafter will be described a processor of the present invention in accordance with a third embodiment. Note that the processor of the present embodiment is identical in hardware configuration as that of the first embodiment (FIG. 1) and will not thus be repeated in detail.

Reference will now be made to FIG. 9 to describe data stored in conversion table storage unit 302. As shown in FIG. 9, conversion table storage unit 302 stores therein a conversion table storing therein a non-compressed instruction code and location designating data correlated one for one for each index provided to specify a non-compressed instruction code. As shown in FIG. 9, determining a single index determines a single non-compressed instruction code and a single item of location designated data.

Figure 10B:
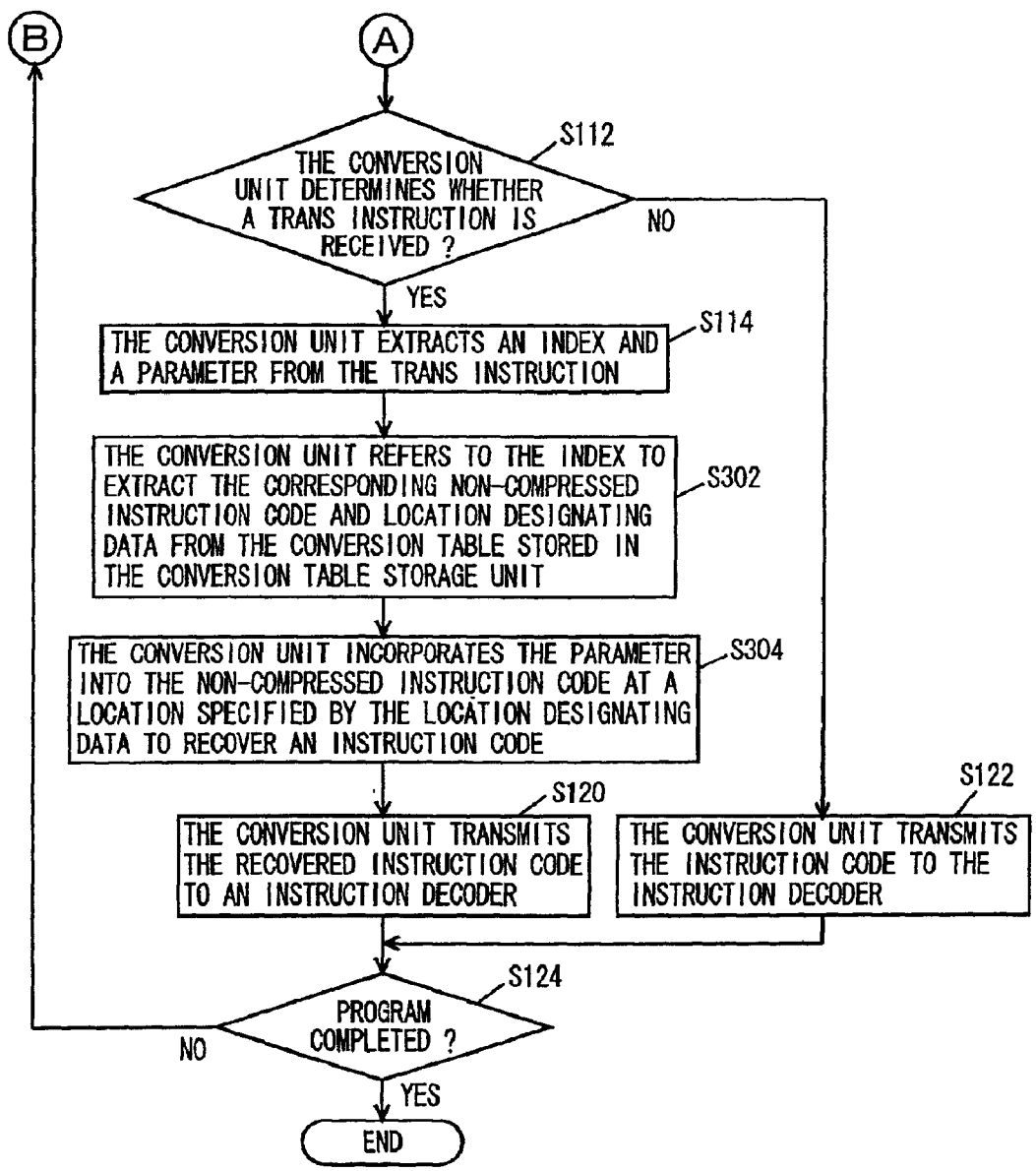

Reference will now be made to FIGS. 10A and 10B to describe a configuration controlling an instruction code recovery process executed by processor 120 in accordance with the present embodiment. Note that any step in the FIGS. 10A and 10B flow charts that are the same as the FIGS. 3A and 3B flow charts is denoted by the same step number and also provides the same process step.

At S300, processor 120 reads from memory 122 an instruction conversion table having location designating data associated therewith and stores it to conversion table storage unit 302. Note that the table stored to unit 302 is the data table shown in FIG. 9.

A program is then executed and if conversion unit 304 determines that an instruction code received from prefetch unit 200 is a TRANS instruction then at S302 conversion unit 304 refers to an index to extract the corresponding non-compressed instruction code and location designating data from the conversion table stored in conversion table storage unit 302. In doing so if the instruction conversion table with location designating data is as shown in FIG. 9 then an index "2" is based on to extract a non-compressed instruction code "1001 1111 1100 0000 0000 0010" and location designating data "4".

At S304, conversion unit 304 incorporates a parameter into the non-compressed instruction code at a location specified by the location designating data to recover an instruction code. Note that the location designating data used is that stored in conversion table storage unit 302.

Thus as well as the second embodiment the present embodiment can also provide a processor capable of incorporating a parameter in a non-compressed instruction code at any location. Furthermore in addition to the second embodiment the present embodiment can provide location designating data designating a location at which a parameter is incorporated that is set for each non-compressed instruction code.

Fourth Embodiment

Hereinafter the present invention in a fourth embodiment will be described. The present embodiment provides a processor identical in hardware configuration to that of the first embodiment, as shown in FIG. 1. It will thus not be repeated in detail.

Figure 11B:
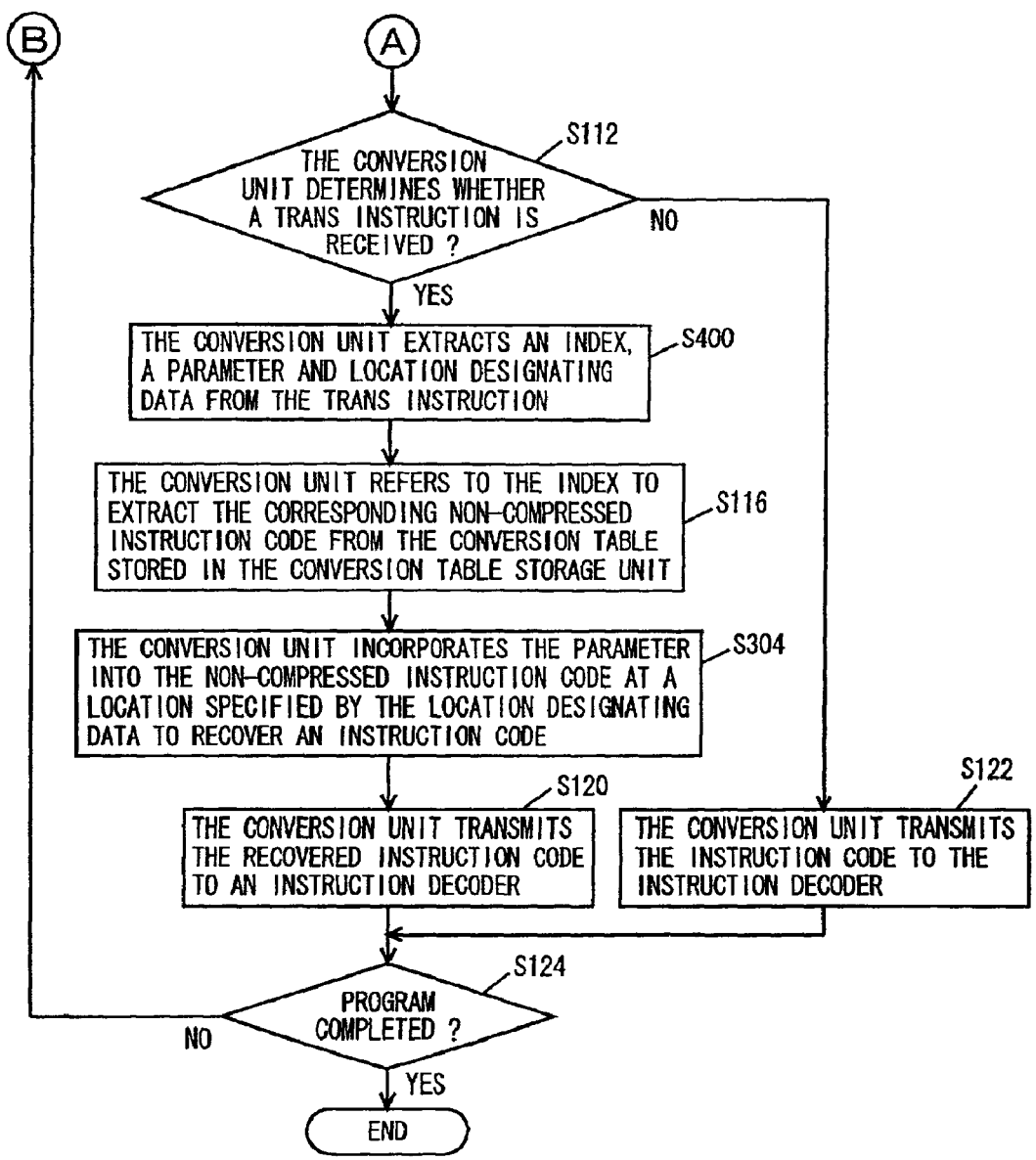

Reference will now be made to FIGS. 11A and 11B to describe a configuration controlling an instruction code recovery process executed by processor 120 in accordance with the present embodiment. Note that any step in the FIGS. 11A and 11B flow charts that are the same as the FIGS. 3A and 3B flow charts is denoted by the same step number and also provides the same process step.

Figure 12:
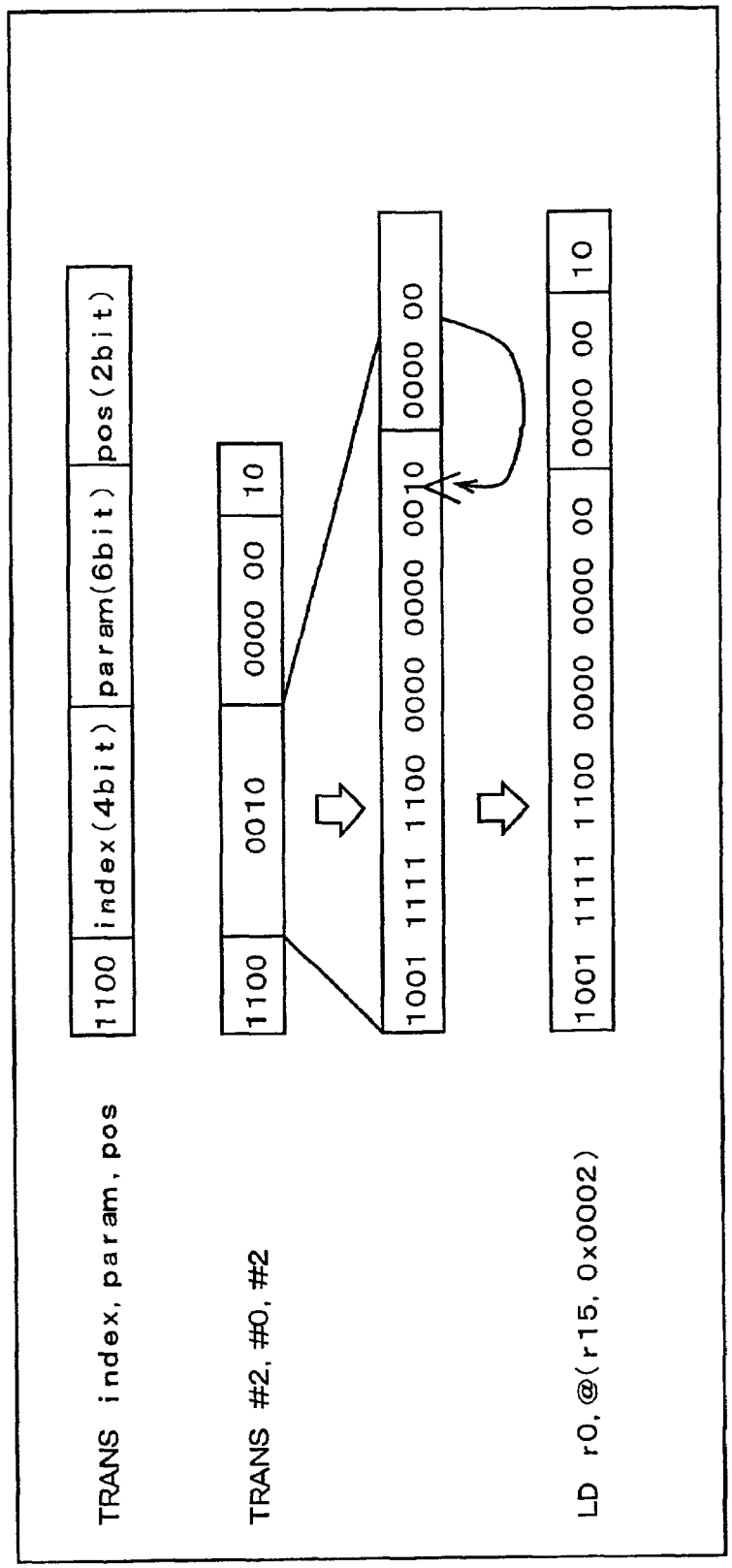
FIG. 12 shows a result of the process provided by the processor of the fourth embodiment.

If conversion unit 304 determines that an instruction code received from prefetch unit 200 is a TRANS instruction then at S400 conversion unit 304 extracts an index, a parameter and location designating data from the TRANS instruction. In doing so, as shown in FIG. 12, it extracts four bits as the index, six bits as the parameter, and two bits of data as the location designating data from the TRANS instruction, and a parameter "0000 00" and location designating data "10" are in this case extracted.

At S304, conversion unit 304 incorporates the parameter into a non-compressed instruction code at a location specified by the location designating data to recover an instruction code. In doing so, as shown in FIG. 12, the parameter is incorporated at a location designated by the location designating data "10" extracted from the TRANS instruction, i.e., a location two bits after the non-compressed instruction code to recover the instruction code.

Thus the present embodiment, as well as the second and third embodiments, can provide a processor capable of incorporating a parameter in a non-compressed instruction code at any location. Note that as the TRANS instruction includes location designating data and the instruction conversion table does not include location designating data, the present embodiment allows using a conversion table storage unit smaller in storage capacity than that of the third embodiment.

Fifth Embodiment

Hereinafter the present invention in a fifth embodiment will be described.

Figure 13:
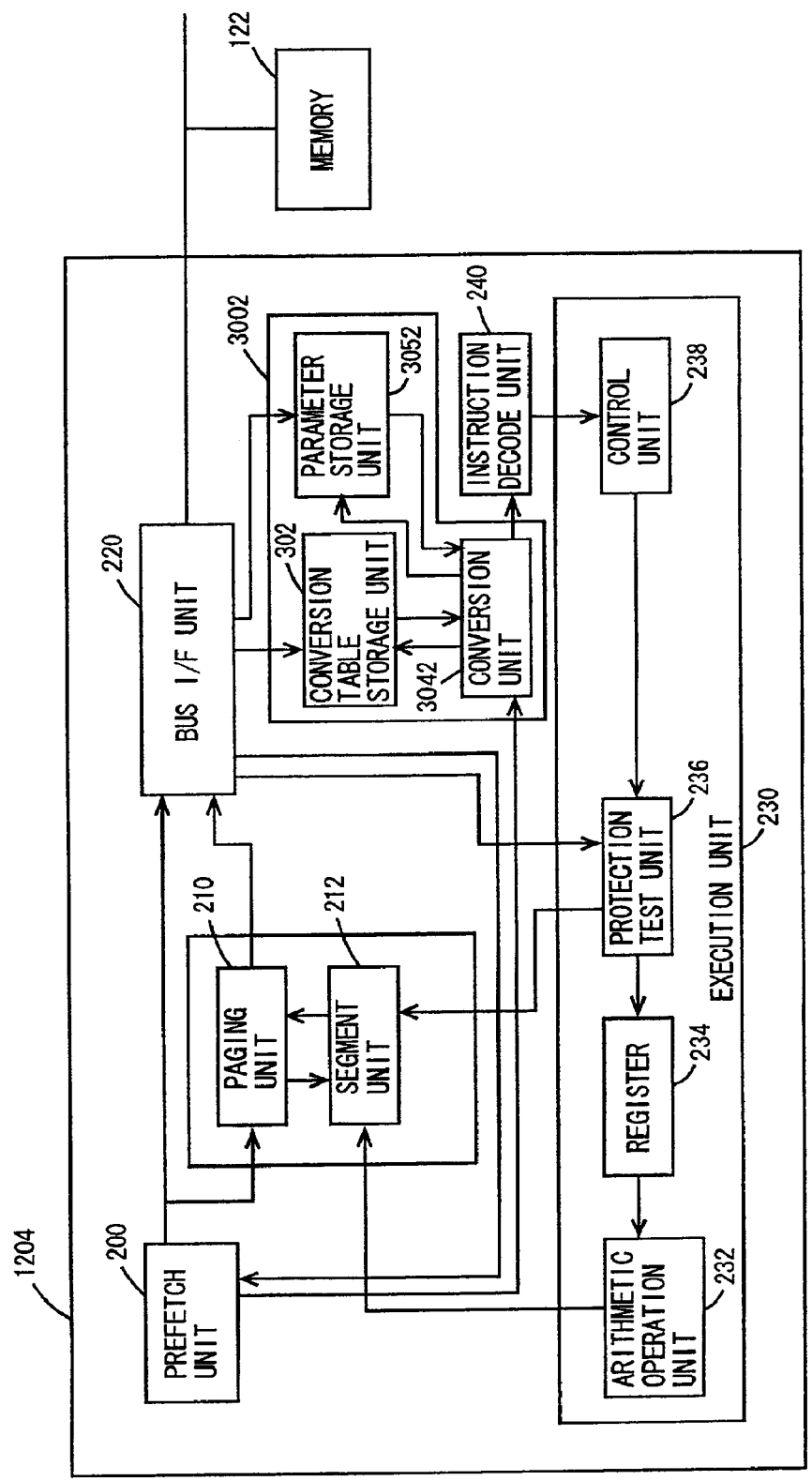
FIG. 13 shows an internal configuration of the processor in a fifth embodiment.

With reference FIG. 13, the present embodiment provides a processor 1204 including a conversion portion 3002 distinguished from conversion portion 300 of the first embodiment. Conversion portion 3002 includes a conversion unit 3042, conversion table storage unit 302 and a parameter storage unit 3052. Conversion table storage unit 302 stores therein the same conversion table (FIG. 2) as the first embodiment. Parameter storage unit 3052 stores the FIG. 14 data therein.

As shown in FIG. 14, parameter storage unit 3052 stores a parameter therein corresponding to a parameter index. When a single parameter index is determined a single parameter is determined. Conversion unit 3042 is different in function from conversion unit 304 of the first embodiment.

Figure 15A:
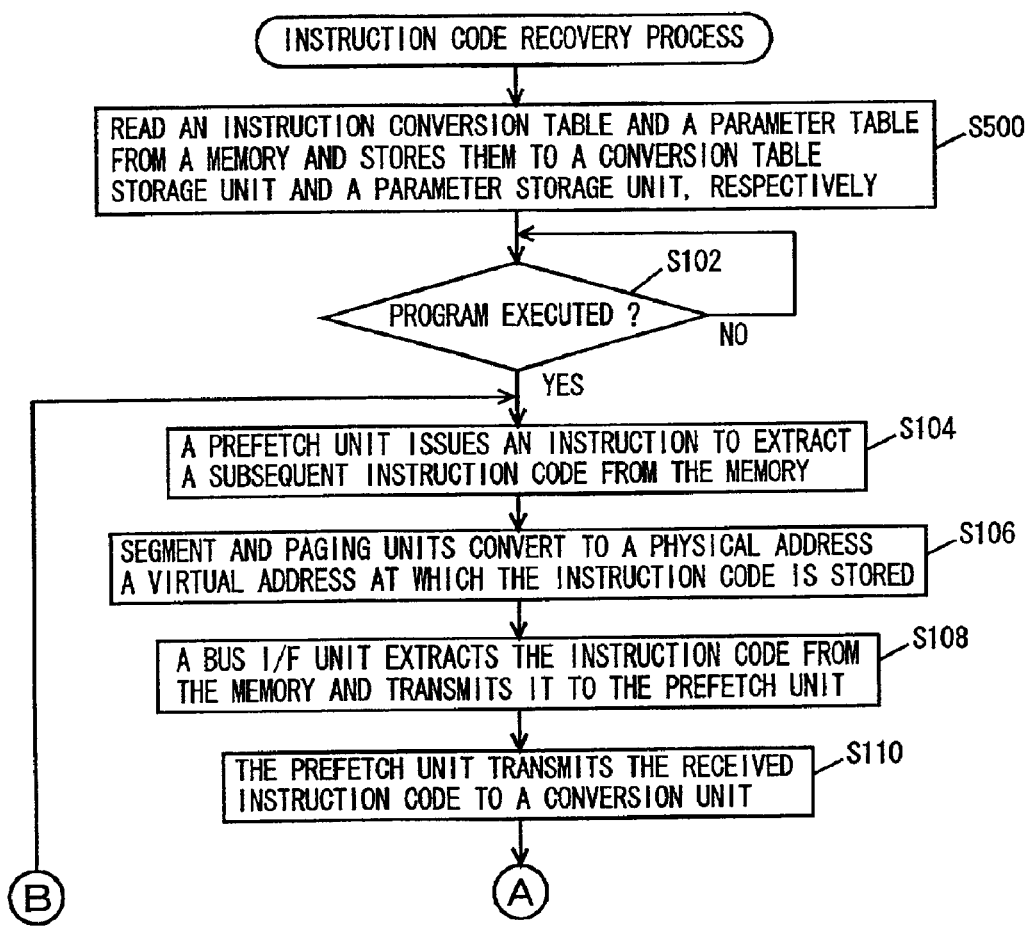
FIGS. 15A and 15B are flow charts representing a procedure of control of a process provided in the processor in accordance with the fifth embodiment.
Figure 15B:
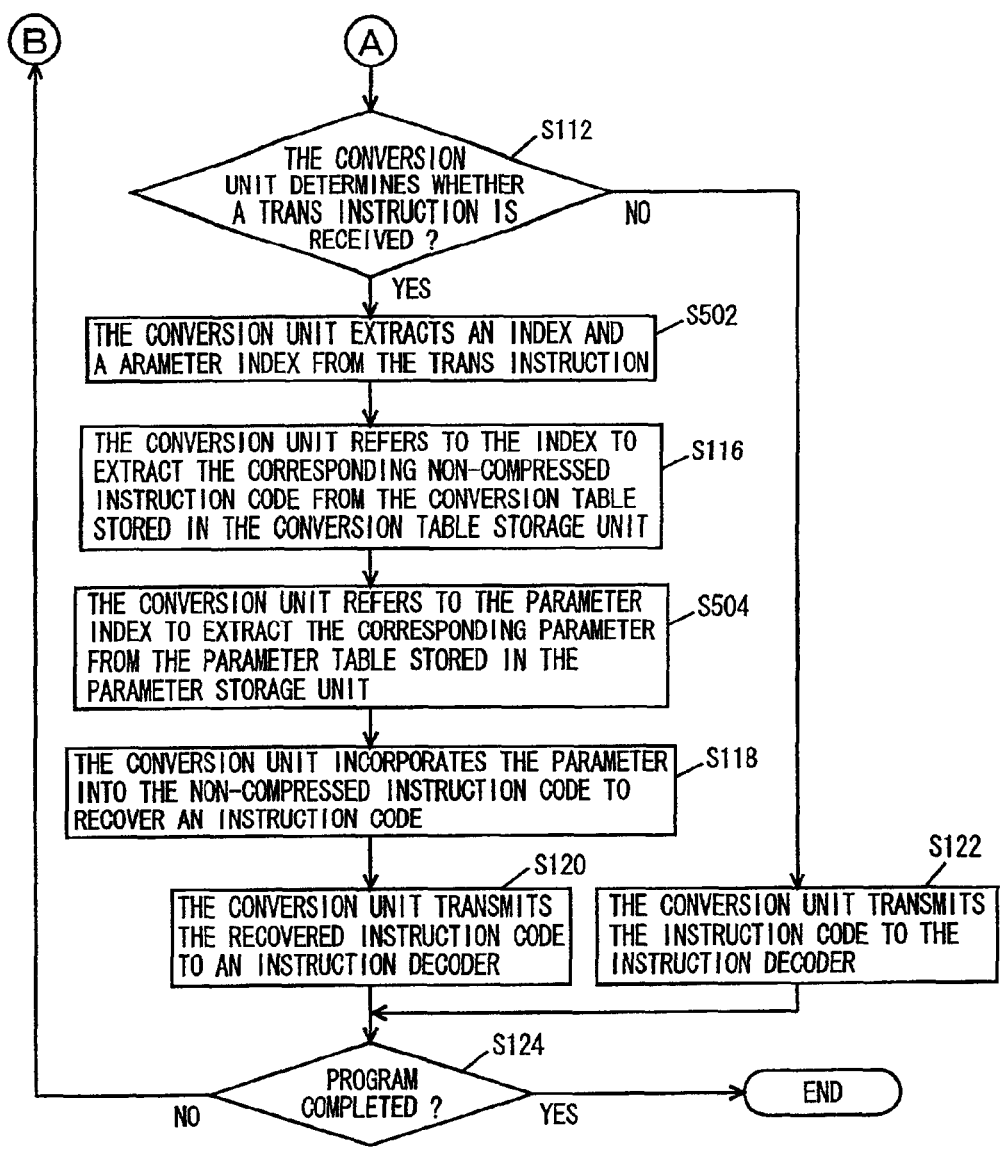

Reference will now be made to FIGS. 15A and 15B to describe a configuration controlling an instruction code recovery process executed by the processor of the present embodiment. Note that any step in the FIGS. 15A and 15B flow charts that are the same as the FIGS. 3A and 3B flow charts is denoted by the same number and also provides the same process step.

At S500, processor 1204 reads an instruction conversion table (FIG. 2) and a parameter table (FIG. 14) from memory 122 and stores them to conversion table storage unit 302 and parameter storage unit 3052, respectively.

When conversion unit 3042 determines that an instruction code received from prefetch unit 200 is a TRANS instruction then at S502 conversion unit 3042 extracts an index and a parameter index from the TRANS instruction. At S504 conversion unit 3042 refers to the parameter index to extract the corresponding parameter from the parameter table (FIG. 14) stored in parameter storage unit 3052. In doing so if the parameter index is "2" then a parameter "1001 0001 0001 0000 0001 0001" is extracted.

Figure 16:
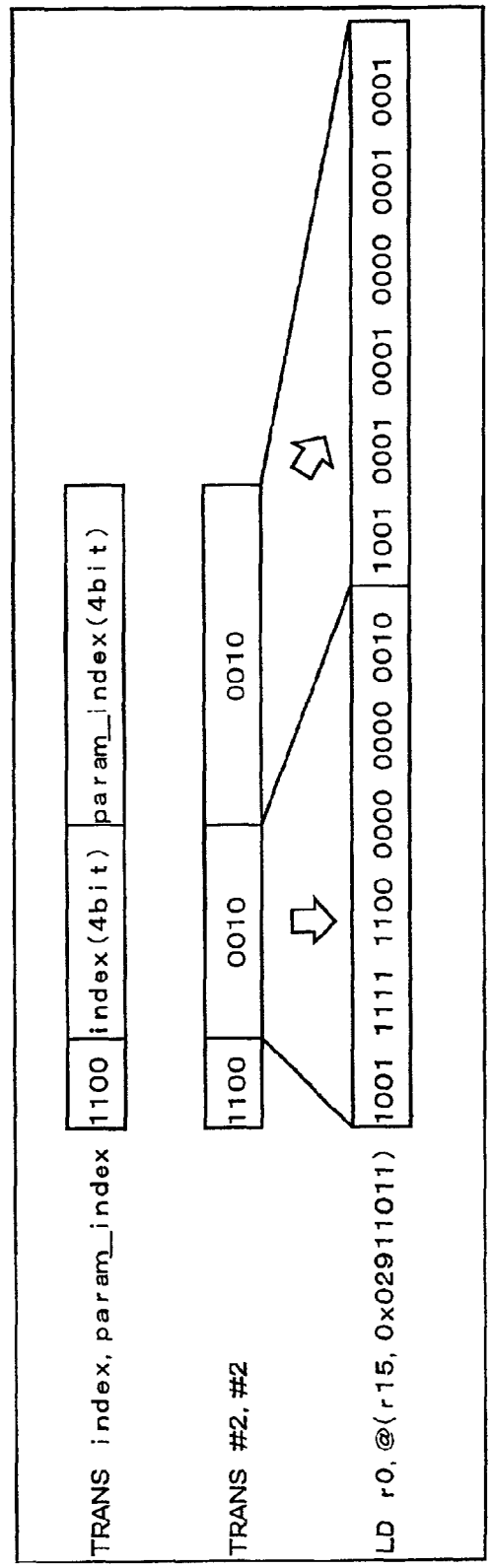
FIG. 16 shows a result of the process provided by the processor of the fifth embodiment.

As shown in FIG. 16, the present embodiment provides a TRANS instruction including an index of four bits and a parameter index of four bits. Conversion unit 3042 extracts a 4-bit index and a 4-bit parameter index from a TRANS instruction (S502). The extracted index is referred to to extract a non-compressed instruction code (S116). Furthermore, the extracted parameter index is referred to to extract a parameter. As a result, as shown in FIG. 16, the extracted parameter is incorporated into the non-compressed instruction code.

Thus the present embodiment can provide a processor capable of using a parameter index to also incorporate a complicated parameter into a non-compressed instruction code.

Sixth Embodiment

Hereinafter the present invention in a sixth embodiment will be described.

Figure 17:
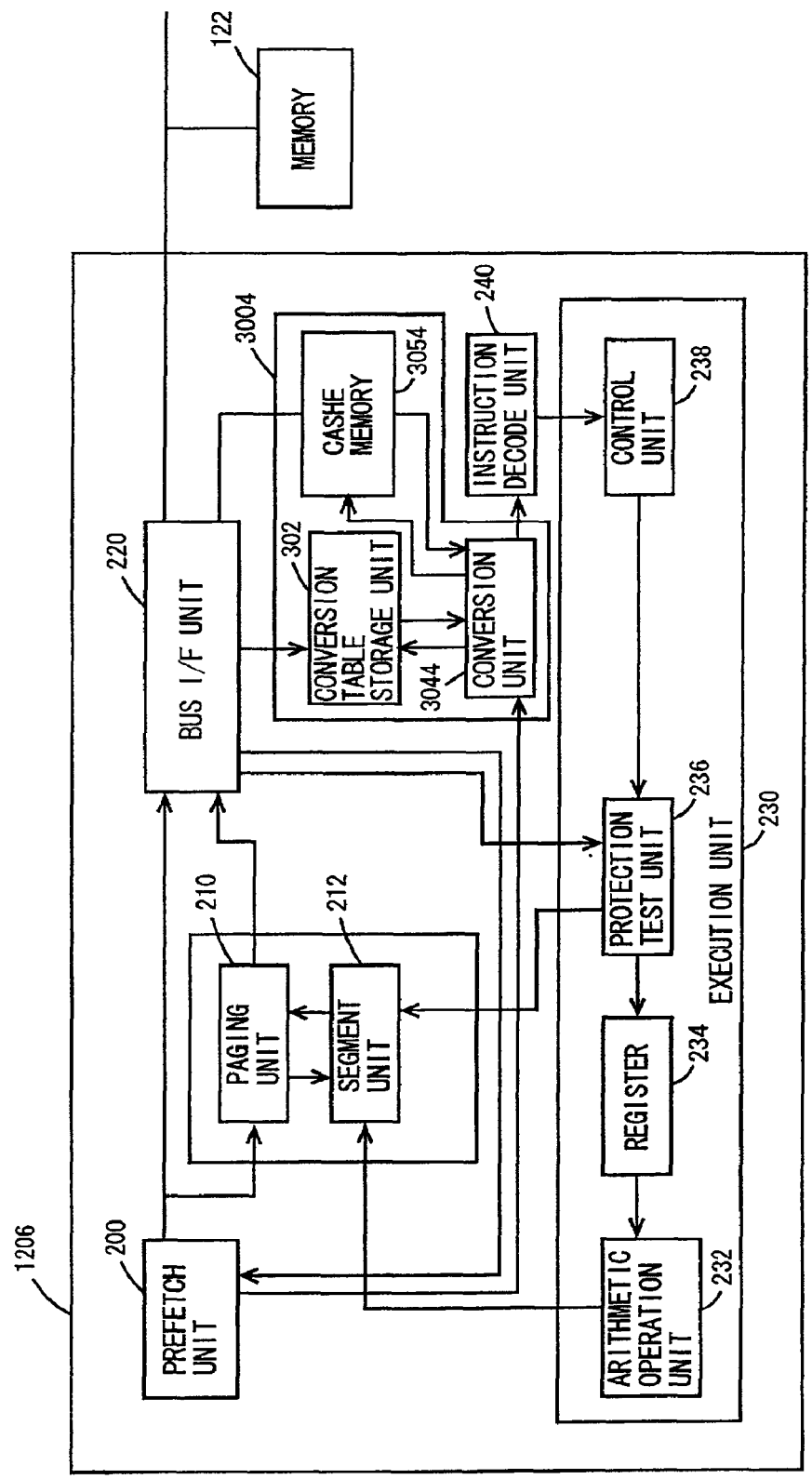
FIG. 17 shows an internal configuration of the processor in a sixth embodiment.

As shown in FIG. 17, the present invention provides a processor 1206 including a conversion portion 3004 distinguished from conversion portion 300 of processor 120 as described in the first embodiment. Conversion portion 3004 includes conversion table storage unit 302, a conversion unit 3044 and a cache memory 3054. Conversion table storage unit 302 stores the FIG. 2 conversion table therein, as has been described in the first embodiment. Conversion unit 3044 is different in function from conversion unit 304 of the first embodiment. Cache memory 3054 is a first-in first-out (FIFO) memory and it is capable of storing at least one recovered instruction code. Conversion unit 3040 can execute an instruction to read a recovered instruction code for cache memory 3054 and it can read a recovered instruction code from cache memory 3054.

Figure 18A:
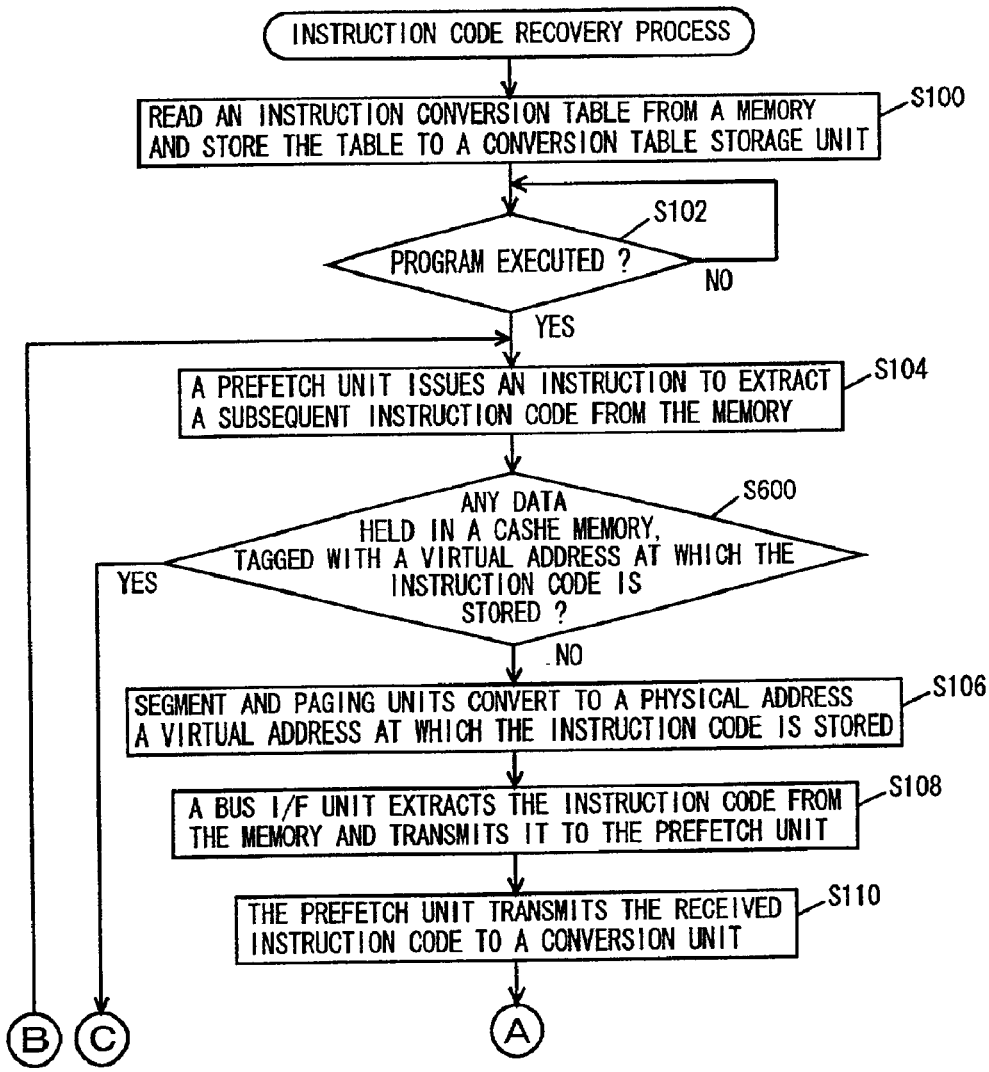
FIGS. 18A and 18B are flow charts representing a procedure of control of a process provided in the processor in accordance with the sixth embodiment.
Figure 18B:
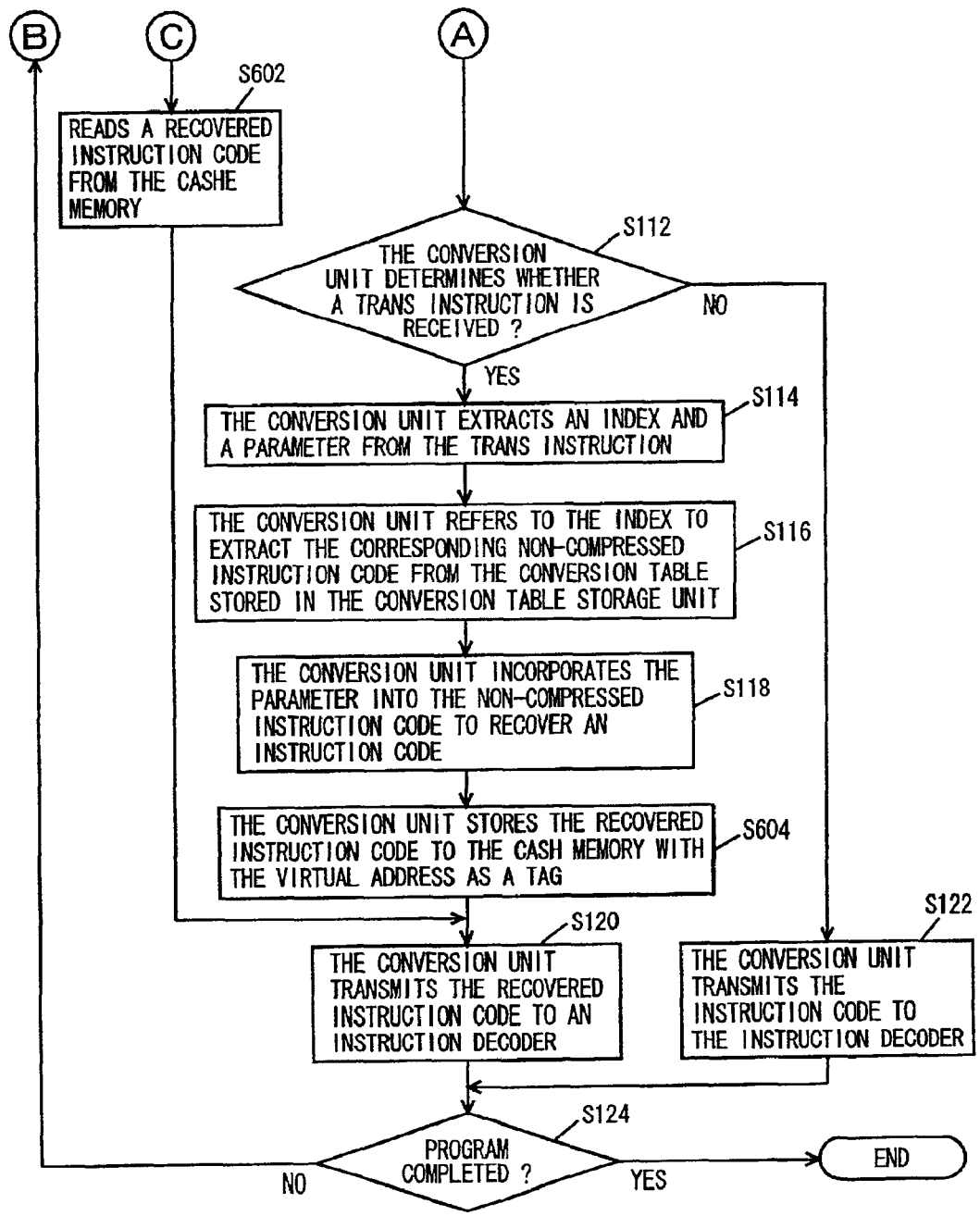

Reference will now be made to FIGS. 18A and 18B to describe a configuration controlling an instruction code recover process executed by processor 1206 in accordance with the present embodiment. Note that any step in the FIGS. 18A and 18B flow charts that are the same as the FIGS. 3A and 3B flow charts is denoted by the same step number and also provides the same process step.

If prefetch unit 200 issues an instruction to extract a subsequent instruction code from memory 122 then at step S600 bus interface unit 220 determines there exists data held in cache memory 3054. In doing so, bus interface unit 220 uses as a tag a virtual address in memory 122 at which an instruction code is stored. If there exists data held in cache memory 3054 (YES at S600) then the process proceeds to S602. If not (NO at S600) then the process proceeds to S106.

At S602, bus interface unit 220 reads a recovered instruction code from cache memory 3054. The read, recovered instruction code is input via prefetch unit 200 to conversion unit 3044.

When conversion unit 3044 determines that the instruction code received from prefetch unit 200 is a TRANS instruction then at S114 conversion unit 3044 extracts an index and a parameter from the TRANS instruction. At S116 conversion unit 3044 refers to the index to extract the corresponding non-compressed instruction code from the conversion table stored in conversion table storage unit 302. At S118 conversion unit 3044 incorporates the parameter into the non-compressed instruction code to recover an instruction code.

At S604 conversion unit 3044 stores the recovered instruction code to cache memory 3054. In doing so, conversion unit 3044 uses as a tag a virtual address in memory 122 at which an instruction code included in a program is stored.

In the processor of the present embodiment an instruction code recovered by a conversion unit is temporarily stored in a cache memory. If with the instruction stored in the cache memory a subsequent instruction is executed then any instruction code is not recovered and the cache memory has the recovered instruction code read therefrom. A repetitively executed instruction code can thus be processed rapidly.

Note that while for the sake of illustration the sixth embodiment is described to correspond to the first embodiment plus a cache memory, the present embodiment is not limited thereto and it may be any of the second to fifth embodiments plus a cache memory.

Other Variations

The above embodiments of the present invention have been described with an instruction of a fixed length substituted with a TRANS instruction shorter in bit length than the fixed-length instruction. For example in the fifth embodiment a 48-bit instruction is substituted by a TRANS instruction of 12 bits in length and in the other embodiments a 32-bit instruction is substituted by a TRANS instruction of 16 bits in length by way of example. The present invention, however, is not limited to any instruction having a fixed length. For example, an instruction conversion table may have each entry provided with a field storing a bit or byte length of a non-compressed instruction code therein to allow a variable-length instruction pattern to be compressed collectively.

Furthermore while in the above embodiments of the present invention a parameter has a bit width of a fixed length, it may have a bit width of a variable length to allow the value to be separately stored, as well as location designating data of a parameter of each of the second to fourth embodiments, to use the same to convert an instruction.

The present invention is applicable not only to reducing through compression of an instruction code a capacity of a memory mounted in equipment incorporating it, but it is also applicable to encoding a large number of parallel instructions in a small number of instruction codes in a parallel processor executing a plurality of instructions in parallel.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An instruction code conversion apparatus converting a first code to a second code longer in bit length than said first code to create an instruction code including said second code, comprising:

a storage unit storing therein information provided for converting said first code to said second code; and a conversion unit connected to said storage unit, receiving said first code and a third code, converting said first code to said second code based on said first code and said stored information, determining a fourth code from said second code and said received third code, and creating an instruction code including said second and fourth codes.

2. The instruction code conversion apparatus according to claim 1, wherein said conversion unit includes a unit exactly incorporating said received third code into said second code at a predetermined location to determine said fourth code to create said instruction code.

3. The instruction code conversion apparatus according to claim 2, further comprising a location storage unit storing therein location data representative of said predetermined location.

4. The instruction code conversion apparatus according to claim 2, wherein said storage unit includes a unit storing therein a conversion table storing therein said second code correlated with said first code, and location data representative of said predetermined location, to convert said first code to said second code.

5. The instruction code conversion apparatus according to claim 2, wherein said first and third codes and said location data representative of said predetermined location are stored in a common memory and said conversion unit includes a unit receiving said location data from said common memory together with said first and third codes.

6. The instruction code conversion apparatus according to claim 1, further comprising a data storage unit storing therein data correlated with said third code, wherein said conversion unit includes a unit extracting from said data storage unit said data correlated with said received third code and incorporating said extracted data into said second code at a predetermined location to determine said fourth code to create said instruction code.

7. The instruction code conversion apparatus according to claim 1, further comprising:

a temporary storage unit connected to said conversion unit to temporarily store said created instruction code correlated with said first code; and a control unit connected to said temporary storage unit and determining whether said instruction code correlated with said first code is temporarily stored therein and if so then controlling said temporary storage unit to read an instruction code from said temporary storage unit.

* * * * *